United States Patent [19]
Bazell et al.

[11] 3,884,242
[45] *May 20, 1975

[54] CATHETER ASSEMBLY

[75] Inventors: Seymour Bazell, Skokie; Ralph G. Ostensen, Morton Grove; Edward M. Goldberg, Glencoe, all of Ill.; Robert D. Walker, Racine, Wis.

[73] Assignee: MPC/Kurgisil, Skokie, Ill.

[ * ] Notice: The portion of the term of this patent subsequent to May 22, 1990, has been disclaimed.

[22] Filed: Oct. 26, 1972

[21] Appl. No.: 301,172

Related U.S. Application Data

[63] Continuation-in-part of Ser. No. 128,898, March 29, 1971, Pat. No. 3,734,100.

[52] U.S. Cl............................ 128/351; 128/349 B
[51] Int. Cl............................................ A61m 25/00
[58] Field of Search ............ 128/348, 349 R, 349 B, 128/349 BV, 350 R, 350 V, 351, 246, 239

[56] References Cited
UNITED STATES PATENTS

| | | | |
|---|---|---|---|
| 2,050,407 | 8/1936 | Wolff | 128/246 |
| 3,358,684 | 12/1967 | Marshall | 128/348 X |
| 3,547,126 | 12/1970 | Birtwell | 128/349 B |
| 3,565,079 | 2/1971 | Jackson | 128/351 |
| 3,709,227 | 1/1973 | Hayward | 128/351 |
| 3,731,692 | 5/1973 | Goodyear | 128/351 |
| 3,734,100 | 5/1973 | Walker et al. | 128/351 |

OTHER PUBLICATIONS

Grillo et al., Jour. Thorac. & Card. Surg., Vol. 62, No. 6, December 1971, pp. 898–907.

*Primary Examiner*—Dalton C. Truluck
*Attorney, Agent, or Firm*—Molinare, Allegretti, Newitt & Witcoff

[57] ABSTRACT

Improved cuff and catheter tip assemblies for catheter tubes of all types, and methods of construction and retrofitting the cuffs to tubes. Cuff assemblies are of low pressure, low volume non-oversized type, and comprise an inner, generally cylindrical, seal member of silicone rubber having a durometer equal to or higher than an outer silicon rubber cuff member to which the seal member is bonded at proximal and distal margins to provide an intra-cuff inflation space connected to an inflation lumen or pilot tube. The inner seal member may be a sleeve or comprise a pair of marginal rings. The seal members also have a compression factor of 5–50 percent, i.e., the inner diameter of the seal members in the relaxed, unstretched condition are 5–50 percent less than that of the catheter tube in proportion to the durometer such that they provide a tight frictional gripping of catheter tube bodies of dissimilar materials, e.g. PVC, to which silicone rubber cannot be bonded, without leakage of inflation fluid under use conditions. The properties of the silicone rubber outer cuff members are such that upon initial full seal with body tissues the cuffs generate transmural pressures below about substantially critical vascular cut-off pressures and tend to reduce substantial tissue pressure necrosis. The cuffs also provide substantial leeway fro volumetric over-inflation without exceeding critical intratissue necrosis-inducing vascular cut-off pressures, i.e. below about 30 mm Hg. The distal and proximal cuff edges may be lapped into grooves incised or molded into the tube body, or butted against the tip assembly to provide a smooth, non-injurious contour. The cuff assembly may be retrofit or currently available tubes.

15 Claims, 12 Drawing Figures

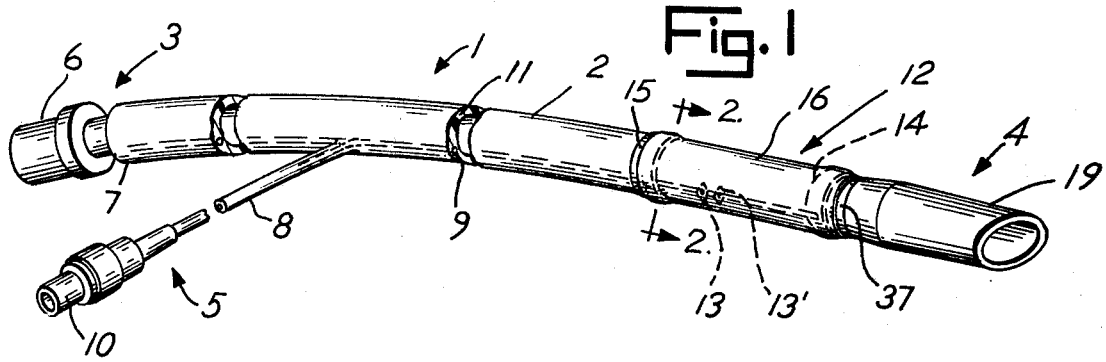
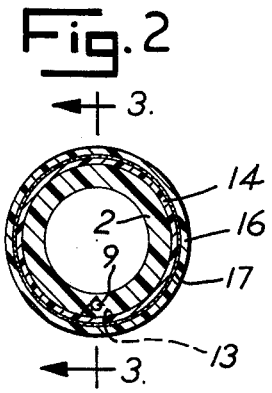
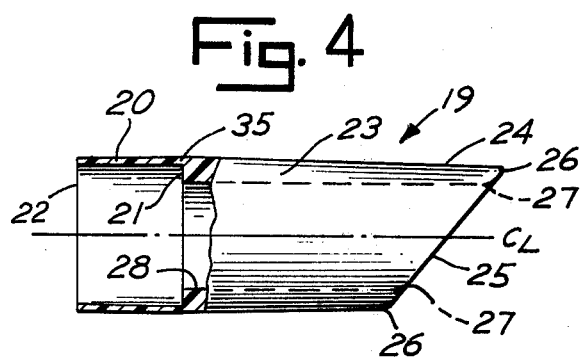
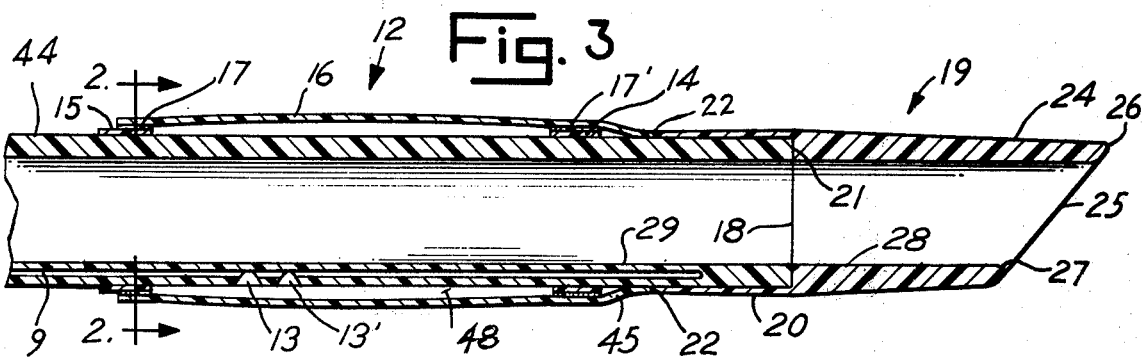
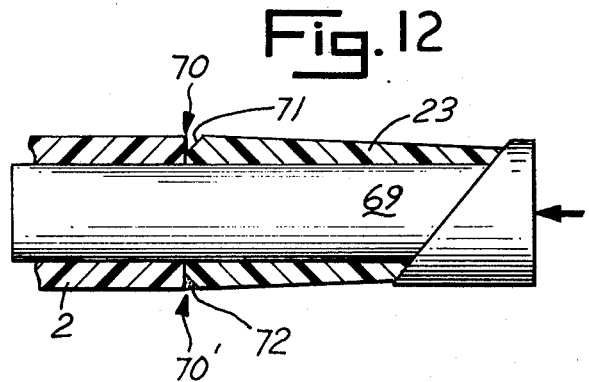
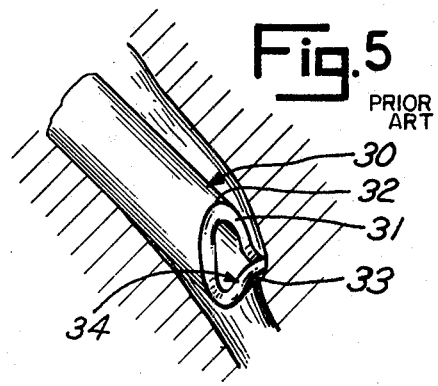

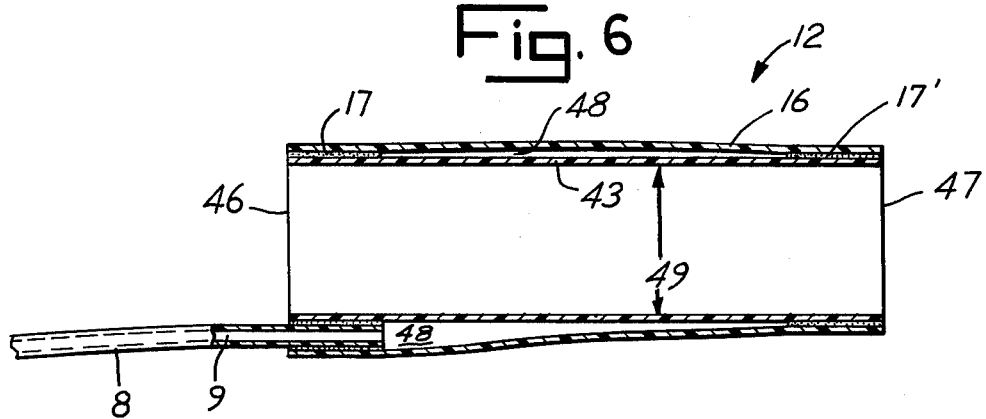
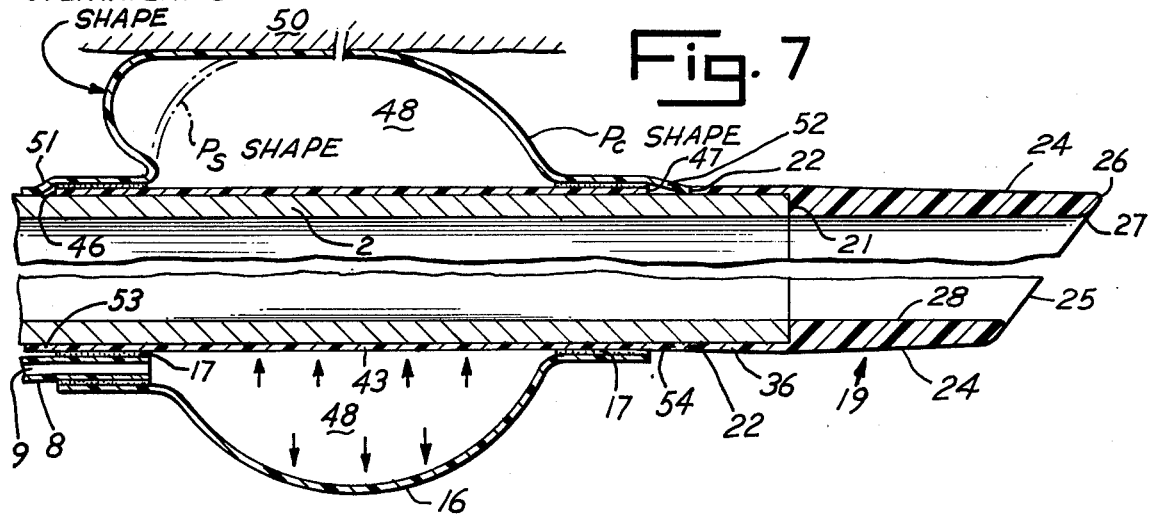
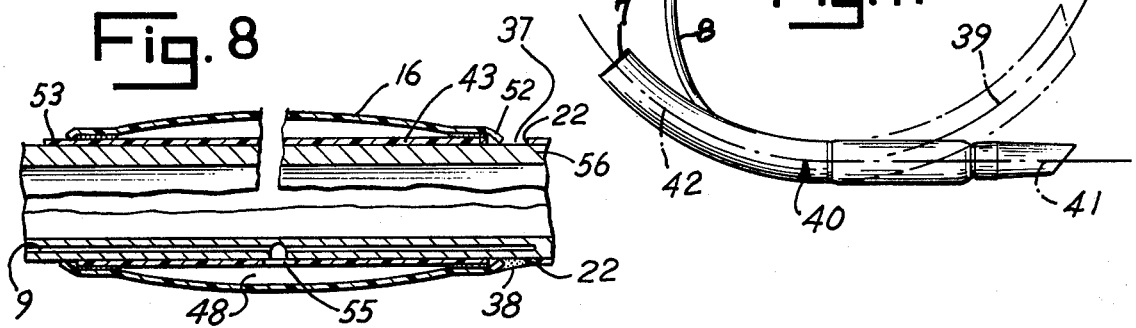
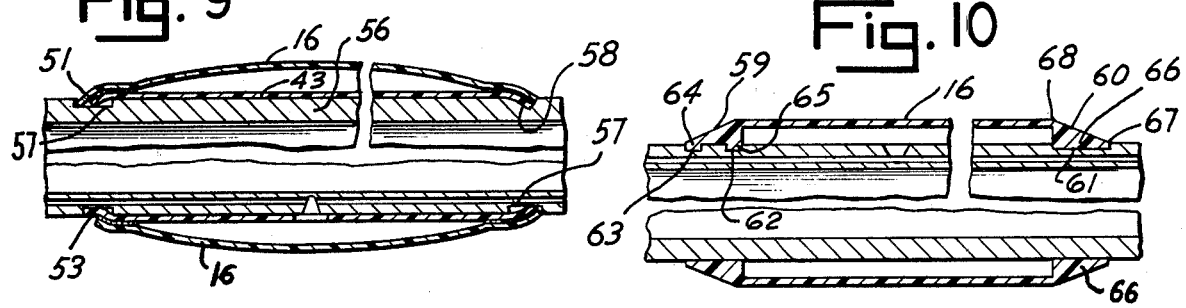

CATHETER ASSEMBLY

This application is a continuation-in-part of earlier filed application Ser. No. 128,898 filed Mar. 29, 1971, now U.S. Pat. No. 3,734,100.

FIELD OF THE INVENTION

This invention relates to catheter tubes useful in medical situations, such as endotracheal tubes, tracheostomy tubes, Foley catheters and the like, where a tube is inserted into the body for medical reasons. More particularly, the invention relates to improved cuff and catheter tip assemblies, methods of construction and retrofitting of the cuffs to the tubes. More specifically, the invention relates to providing a special silicone rubber cuff which may be employed with dissimilar plastic, rubber, or metal tubes to which the silicone rubber is normally nonbondable to provide a cuff which produces transmural pressures upon sealing inflation of values which tend not to induce substantial tissue pressure necrosis. The tip assembly is precision molded of a plastic, rubber, or silicone rubber material of equal or higher durometer than is used for the body portion of the tube itself, and is characterized by a tapered profile to reduce tissue lesions upon insertion or removal, and precision molded chamfered edges and openings. The tip may also have a medially extending tapered collar or bevel for fitting or sealing the tip to the body portion of the tube.

BACKGROUND OF THE INVENTION

Catheters are extremely important and useful medical tools for the input or withdrawal of fluids from the body of a patient. Catheters are often tubular in shape and have a retaining and/or sealing inflatable balloon cuff near the distal (intracorporeal) end of the tube. Often the catheters must remain in place for substantial periods of time. Present catheters have not been entirely satisfactory since they tend to cause tissue necrosis from pressure or biochemical incompatibility of the inflatable balloon cuffs. For example, standard rubber cuffs of endotracheal tubes in place for as little as 72 hours can cause severe necrosis. Latex material is chemically irritating, and polyvinylchloride plastic cannot elongate sufficiently to provide adequate low pressure balloon volumes, has no memory and prunes upon deflation.

Physicians and anesthesiologists are only just now becoming aware of the severe damages which catheter tubes may cause at the time of insertion or withdrawal from the body and of the damage which inflated cuffs may cause on the adjacent tissues with which they come into contact.

In early tubes of rubber material construction, for example the Rusch-type tubes, the tube, tip, and inflatable cuff were made of uniform durometer material. However, the durometer had to be selected to be sufficiently hard for ease of insertion into the body. When the tube is too soft, insertion of an endotracheal tube (taken by way of illustration) becomes exceedingly difficult since the tube tip may collapse or the tube may kink upon being forced past the vocal chords.

With the advent of newer plastic materials such as polyvinylchloride (PVC), attempts were made to provide all-PVC tubes, i.e. tube, cuff and tip of PVC. Although the PVC was well suited to make the body of the tube, PVC cuffs were not suitable because the PVC is of low extensibility. The PVC cuffs are extremely hard and transmit pressures sufficient to cause venous collapse in the surrounding tissues. This venous collapse is then followed by buildup of edema which in turn results in back pressure sufficient to cause capillary collapse. The vascular beds adjacent to the site of contact of such cuffs become sufficiently constricted in normal use that pressure necrosis and ischemia occur causing medically significant damage to the tissues. This is well documented in the literature.

One approach to attempting to solve the problem was to provide nonextensible, large residual volume (oversized) cuff constructions. These oversized cuffs were characterized by having the PVC plastic, latex, or rubber in an enlarged, baggy or folded condition prior to insertion. It was postulated that relatively high volumes of intra-cuff air would be required to expand these loosely folded cuffs into contact with the trachea walls, as in the case of endotracheal or tracheostomy tubes. However, there was no full recognition of how low the critical pressure had to be; i.e. pressure which could be transmitted safely to the adjacent tissues without causing significant tissue pressure necrosis. For example, Cooper et al., in "Experimental Production and Prevention of Injury Due to Cuffed Tracheal Tubes", Surg., Gyn. & Obst., December 1969, p. 1235–1241, considered that intramural pressures on the order of 40 mm. of mercury would be permissible. However, these pressures are far too high. Efferent venous collapse occurs at a range of 4–7 mm. mercury; in the supine individual (e.g. during surgery) venous collapse occurs at pressures from about 8–15 mm. mercury, with the average being above about 10 mm. mercury. The capillary bed constriction commences at approximately 20–25 mm. mercury.

However, typical prior art material such as rubber and polyvinylchloride produce transtracheal or transmural pressures, measured by the difference between the pressure at seal and the contact pressure, of from about 29–210 mm. mercury. This is from 145 to 1050 percent greater than the critical 20 mm. mercury pressure for commencement of capillary bed constriction.

A further problem with the oversized type of cuffs is that the insertion procedure is "blind", i.e. the anesthesiologist is unable to view the vocal chords upon insertion of the tube. Consequently, the vocal chords can be damaged upon insertion. As a natural reaction to this, the anesthesiologist usually picks a tube which is quite small relative to the size of the trachea. However, this defeats the purpose of the oversized cuffs, since upon inflation, the cuffs are not extensible and do not have the slack with which they were designed to permit low volume inflation. In order to make full seal, additional air volume must be applied. But the pressures transmitted by the cuff to the trachea walls then exceeds the critical pressure of vascular constriction.

If proper sized tracheal tubes are used with the oversized cuffs, the cuffs upon inflation have wrinkles and folds in them which may promote leakage and imperfect seal. In order to compensate for this, the anesthesiologist in actual operation tends to overinflate the cuff in order to flatten the wrinkles against the inside of the trachea tube. In the process, uneven pressures are developed. More significantly, from a medical view, pressures in excess of critical vascular constrictive pressures are developed.

Because of the inelasticity of PVC, it cannot be used in satisfactory standard non-oversized type construction form of endotracheal tubes. But even in oversized forms, the anesthetist in actual practice attempts prestretching the very hard PVC plastic film used for the cuff by heating it, for example, by holding it under hot tap water. However, this renders the endotracheal tube non-sterile, and permits the PVC to expand non-uniformly and take an improper "set" when it cools. Neither are conducive to medical safety. Martinez, in Anesthesiology 34, pp. 488–89 (1971) reports extensive tracheal necrosis associated with a prestretched tracheostomy tube cuff.

In short, the prior art went in the direction of constructional design changes (oversized cuffs) in an attempt to overcome the poor properties of PVC and rubber then in use, e.g. hardness and inelasticity. But in so doing, they were insensitive to the actual surgical problems that the resulting oversized cuffs presented. These problems led to overinflation which is a full-circle return to the hard inelastic properties of PVC and rubber then in use.

There is still another problem associated with the PVC plastic catheters. Normally the tube in an endotracheal or trachestomy tube has an end which is cut on a bias in order to facilitate ease of insertion. The tubes are normally extruded and the insertion ends are bias-cut and heat treated to smooth the rough-cut ends with RF, infrared, resistance heating or flame. However, the heat treating of the tip of the plastic PVC tube causes a bead-like thickening at the edge. This tends to make the outside diameter of the tip larger than the nominal diameter of the tube, and at the same time renders the internal opening in the tube of smaller diameter than the nominal diameter of the tube. The former means that the tube is larger and tends to cause more damage upon insertion. The latter means that tubes passed down the central lumen of the tracheostomy tube or endotracheal tube, e.g. drainage tubes or the like, must be smaller than maximum capacity in order to pass through the constricted opening at the tip. Still further, there is no completely consistent way of production line control of heat treatment for each tube. That is, the heat treatment results in each tube having a somewhat different confirmation and degree of enlargement. Thus, since no two tubes have the same configuration, the anesthetist or doctor using the tube may not rely on past experience in making judgments about the sizes of tubes to use in a given medical situation.

Still further, constructing the tube body, from distal to proximal ends of the identical material evidences a failure to recognize that different portions of the tube must have different properties because of differing functions. As noted above, the cuff should be of a type which does not have necrosis inducing pressures in the adjacent tissues. We have also recognized that the main body of the tube should be relatively flexible, of a moderate durometer to be easily bent to conform to natural variations in the longitudinal (axial) shape of the trachea or other opening or passage through which the tube is being inserted. However, we have discovered that the tip must be of a durometer equal to or higher than the body so as to provide for ease of insertion and prevent the tip from being folded back upon itself upon striking an obstruction. In contrast, the prior PVC tubes, being heat treated at the end present substantially the same durometer for the tips as for the main body portion of the tube. In cases where the heat treatment is excessive, the PVC may actually be degraded and the durometer lowered thus aggravating the problem of having too soft a tip.

In our co-pending application, Ser. No. 128,898 we have disclosed and claimed catheter tubes constructed entirely of silicone rubber having a special conformable type cuff of a silicone rubber which has properties which generate transmural pressures that tend not to induce tissue pressure necrosis in the site of cuff inflation. More specifically, we have therein disclosed our discovery that a silicone rubber of low modulus, having properties of a Shore A hardness of less than about 30, a tensile strength of below about 700 psi, an elongation of above about 1000 percent, and a stress value upon sealing inflation of less than about 30 percent of the breaking stress of said cuff material permits providing a conformable, extensible, standard (non-oversized) type of cuff which produces sealing pressures upon inflation that do not tend to induce tissue pressure necrosis.

However, it has long been impossible, on a practical commercial basis to sealingly bond silicone rubber to polyvinylchloride plastic or to other plastics, rubber or metal tubes on a consistent, medically reliable basis. While all-silicone rubber catheters are useful as such, they are relatively expensive and thus present some hindrance to single use, throw-away application. In addition, many hospitals already have catheters which employ cuffs that develop pressures too high for medical safety.

Therefore, there is a need for a low pressure, low volume, extensible, conformable silicone rubber cuff of special properties which develop pressures which are below those which tend to induce any substantial tissue pressure necrosis, and yet may be applied to dissimilar catheter tube body materials, and may be combined with special durometer tips of precise, medically non-injurious dimensions, and which may be retrofit onto existing tubes having high pressure, medically injurious cuffs and/or tips.

THE INVENTION

It is therefore an object of this invention to provide improved cuff and catheter tip assemblies for catheter tubes of all types.

It is another object of this invention to provide an improved cuff of a silicone rubber material which produces transmural pressures at substantially full initial seal of values that do not tend to induce substantial tissue pressure necrosis at the site of cuff inflation in the body.

It is another object of this invention to provide a special catheter cuff assembly of silicone rubber material which may be applied to dissimilar catheter tube materials, or retrofit on to existing catheter tubes.

It is another object of this invention to provide a special catheter tip of generally equal or harder durometer than used for catheter tubes to facilitate ease of insertion and withdrawal of the tube in the body and which avoids collapsing upon encountering obstructions upon insertion.

It is another object of this invention to provide improved catheter tips which are molded of durometer material equal or harder than the catheter tube body which have precisely molded tapered configurations and the openings in which have smoothly chamfered edges which are not enlarged as in prior art tips.

SUMMARY

One aspect of this invention includes a silicone rubber cuff assembly in which the silicone rubber portion contacting the body tissue into which the catheter is inserted has special properties such that the transmural pressure developed by the balloon upon the initial full seal does not tend to induce tissue pressure necrosis. A special inner seal sleeve member, or a plurality of seal rings, or bands, or high modulus and durometer silicone rubber are provided and an outer, low modulus and durometer rubber is bonded thereto. The inner seal member is generally tubular in shape and has a 5–50 percent compression factor, that is, the unassembled diameter of the seal member is 5–50 percent less than the tubular portion of the catheter body on which it is to be mounted. The inner seal member or rings are stretched over the tube for mounting and the circumferential tension thereof provides a frictional, mechanical type of bond to the tube which prevents inflation fluid leakage, and prevents the cuff from being dislodged during use. This permits the cuff to be mounted on tubes of materials which ordinarily do not permit reliable sealing thereto, as by chemical gluing or bonding. Special provision is also made for providing a smooth transition between the distal and proximal ends or margins of the cuff and the catheter tube body on which it is carried.

The invention also includes a specially molded tip of equal or harder durometer than standard extruded plastic or molded tubes. The special tip is characterized by a tapered profile which assists in ease of insertion. The leading edge of the tip has precision molded chamfers which provide for medically smooth traveling edges.

The invention also includes a combination polyvinylchloride tube having the cuff assembly of this invention mounted thereon and a specially molded selected durometer polyvinylchloride tip secured to the distal end thereof. Such tubes may be constructed having a hyperbolic curve or set to the tubes with the proximal end being more curved than the distal, tip and cuff-carrying end. This assists in inserting and lessens tip necrosis in use. This in contrast to the tubes of the prior art which naturally carry a semicircular set resulting from manufacturing processes employed by PVC tube manufacturers. The tips may be color coded to facilitate identification and size mistakes, and may also be rendered radio-opaque for fluoroscopic location during use.

Still further and other objects of this invention will become evident from a review of the detailed description which follows.

FIGURES

The description below has reference to the following figures in which:

FIG. 1 is a perspective view of one embodiment of the present invention showing a plastic catheter tube having placed thereon a special silicone rubber cuff of this invention and the distal end of which employs the special tip of this invention.

FIG. 2 is a section view of a cuff assembly embodiment taken along the line 2—2 of FIG. 1.

FIG. 3 is a section view of one embodiment of the special cuff and tip assembly placed near the distal end of a catheter tube body of dissimilar shows material and shown in detail the mounting features of both the cuff and the tip.

FIG. 4 shows partly in perspective and partly in section constructional details of one embodiment of the special tip of this invention.

FIG. 5 shows partial closure of the tip of a prior art catheter wherein the body of the catheter and tip are made of a single material of relatively low durometer.

FIG. 6 is a sectional view of a retrofit cuff assembly and separate inflation lumen in accordance with this invention.

FIG. 7 shows several aspects of the retrofit silicone rubber cuff of FIG. 6 in use upon a catheter body of dissimilar material. This figure also shows the free shape of the cuff, the shape upon initial contact, upon initial full seal, and the shape upon overinflation.

FIG. 8 shows in section three embodiments of the marginal seal of a retrofit balloon on a catheter body of dissimilar material.

FIG. 9 shows in section three embodiments of a retrofit cuff which provides for smooth, non-irritating edge seal of the cuff to dissimilar catheter body materials.

FIG. 10 shows in section two other embodiments of the cuff construction of this invention.

FIG. 11 shows in plan view the generally hyperbolic shape of the catheter tube of this invention as compared to the generally semicircular shape of prior catheters.

FIG. 12 shows in section another embodiment of the tip of this invention and a method of securing the tip of a catheter tube body.

DETAILED DESCRIPTION

The following detailed description makes particular reference to a polyvinylchloride or stainless steel catheter tube. This description is by way of example only and is not meant as limiting of the invention since the principles shown herein may be applicable to catheter tubes of various materials. The selected durometer tips as described in this invention are described as constructed of polyvinylchloride by way of example only. It should be understood that they may be made of any plastic or elastomeric material which permits them to be bonded to the main body of the catheter tube as by chemical bonding, solvent bonding, thermal treatment, or mechanical interlock. It should also be understood that while the description is made herein with reference to an endotracheal tube, this description is by way of example only and the principles of this invention may be applied to all types of catheter tubes, including tracheostomy tubes, Foley catheters, endotracheal tubes, urethral catheters, and catheters for use in gastric, esophageal, pharyngeal, nasal, intestinal, rectalcolonic, choledochal, arterial, venous, cardiac and endobronchial applications.

FIG. 1 shows, by way of example in endotracheal or tracheostomy tube 1 which is composed of main body portion 2, broken into several parts so as to show within the space available the proximal end assembly 3, distal end assembly 4, and inflation assembly 5. The proximal assembly 3 may include a connector 6 for attachment to a source of oxygen or vaporous anesthetic for administration to the patient by way of the lungs. This connector 6 may be inserted into the proximal end 7 of the main body portion 2, which end is terminated normal to the long axis of the tube. The inflation assembly 5 includes a pilot tube 8 connecting medially of the main portion 2 with an inflation lumen 9 which is formed in the wall of the main body portion. The proximal end of the pilot tube 8 is terminated in an appropriate connector 10 for attachment of a cuff inflating device, such as a syringe for inflating the cuff with air or fluid, such as water or saline solution. As discussed herein, the inflation medium for the endotracheal tubes is air, administered by way of hypodermic syringe (not shown) attached to the connector 10. Also by way of example, the description herein is of a main body portion 2 extruded from polyvinylchloride plastic of a durometer suitable for flexibility in use in medical situations, yet not so soft and flexible that the tube collapses in use. For example the durometer of the PVC tube typically ranges from 60–85 Shore A hardness. The inflation lumen 9 is normally formed during the extrusion operation.

It should be understood, however, that the inflation lumen 9 may be disposed in any manner desired in association with the main body portion 2. For example, the inflation lumen need not be in the wall 11 of the body 2, but may be formed by attaching the pilot tube 8 to the body portion 2 along the side, extending in the direction of the proximal end until it connects to the cuff assembly. Likewise, as shown in FIGS. 6 and 7, the pilot tube 8 with inflation lumen 9 may be contiguous to the tube 2 but not connected thereto.

The cuff assembly 12 is placed medially of the distal end of the main body portion 2 and the interior of the cuff communicates with the inflation lumen 9 by means of one or more apertures 13, 13'. FIG. 1 also shows one embodiment of the frictional securing means for the silicone rubber cuff comprising a pair of high durometer and modulus sealing rings 14, 15. The outer cuff member 16 is the low durometer and modulus silicone rubber member (Shore A hardness less than about 30) which contacts tissue, such as the tracheal wall, and has special properties (as described in more detail below) which tend to lessen inducing tissue pressure necrosis by vascular flow cutoff in tissues adjacent to areas of contact of the inflated cuff. The outer silicone rubber cuff member is chemically bonded to the securing inner member or members by the use of an adhesive silicone rubber which may be air-dried and/or heat-cured to provide bonds 17, 17' (see FIG. 3) which are permanent under conditions of use. For example, a Dow-Corning "Silastic" brand medical grade type A adhesive may be used, or any suitable RTV type may be used.

The distal end assembly 4 includes a precision molded tip 19 secured to the distal end 18 of the body 2 (see FIG. 3). The tip may be seen in more detail in FIGS. 3, 4 and 7. With reference to FIG. 4, the tip 19 is precision molded of a plastic or elastomeric material of equal or harder durometer than the main body portion 2. Whereas the typical durometer of polyvinylchloride body portion tubes ranges from a Shore A hardness of above 60 to about 85 the durometer of tip 19 will range from 60–95. We prefer the tip durometer to be greater than the body durometer, in the range of from about 75 to about 95. While the tip is shown and described herein by way of example as constructed of polyvinylchloride, it should be understood that the tip may be of any moldable plastic or elastomeric material which can be secured to the body portion 2 as by adhesive, solvent bonding, thermal bonding, (such as infrared, resistance heating, RF, and including spin welding), or frictional and mechanical interlock with the body portion 2. We prefer bonding of tip 19 to the distal end 18 of body 2 by means of compatible adhesives, solvents or plasticizers.

The tip 19 may include a proximal flange portion 20 which may be tapered inwardly from approximately the region of the shoulder 21 to the proximal edge 22. The proximal edge 22 is typically normal to the axis of tip and body portion 2. The distal portion 23 has an inwardly tapered profile and terminates in a transverse leading edge 25, in the case of endotracheal or tracheostomy tubes. The The transverse leading edge 25 has both an outer chamfer or rounded edge 26 and an inner chamfer or rounded edge 27. The axial bore 28 of the tip 19 has an inner diameter the same as the inner diameter 29 of the body portion 2 (see FIG. 3). The precision molded leading edge and tapered profile provides for ease of insertion and withdrawal of the catheter tube from the body while the relatively long, in the axial direction, flange portion 29 provides for adequate mechanical or chemical seal to the body portion 2.

The chamfered leading edge in precision molded thus providing catheter tubes having identical insertion tips. The leading edges of the tubes of this invention are not irregular in shape, rough or sharp due to a transverse cut, nor are they larger on the outside than the main body portion, while at the same time smaller at the inner diameter, due to beading from flame or other thermal smoothing of the transverse cut edge. In addition, the increased hardness (durometer) prevents folding over of the tip upon striking an obstruction when inserted into the body, as seen for example in FIG. 5. Prior PVC tips have a transversely cut end 31, and trailing edge 32 of which may be relatively sharp, while the leading edge typically illustrates the beading 33, and folding as shown at 34 in FIG. 5.

It should be understood that while the tip flange portion 20 may have an inward taper such that the proximal edge 22 has a wall thickness thinner than the distal portion of flange 20, the flange may be of equal thickness throughout as shown by uniform wall thickness 36 in FIG. 7. This wall thickness may be varied to provide for smooth transition between the tip and the body portion 2 or the cuff assembly 12. As shown in FIG. 1, there may be a gap 37 between the proximal edge of the tip 19 and the distal end of the cuff assembly 12. As seen in FIGS. 3 and 7, the flange portion 20 may extend proximally far enough to abut the cuff assembly 12. Where the cuff assembly 12 is spaced from the proximal edge 22 of the tip flange portion to leave a gap 37 (see FIG. 8), that gap optionally may be filled with a material to provide a smooth transition therebetween. For example, a silicone rubber adhesive material 38 may be applied at this juncture to provide a smooth transition. Although the silicone rubber adhesive may not bond to the polyvinylchloride tip or to the polyvinylchloride or metal body portion 2, it will bond to the silicone rubber cuff members and provide a smooth transition.

FIG. 12 illustrates another embodiment of the tapered tip 19. In this embodiment, flange 20 is replaced by proximally extending bevel 71. To secure this tip form to tube body portion 2, tip 19 is slipped over mandrel 69 which is then fitted into bore 29 of tube 2. The mandrel may be spring biased axially in the medial direction of tube 2, as shown by the arrow on the right of FIG. 12. Heat is applied circumferentially from source 70, 70' to the bevel and distal end 18 of the tube 2. Upon softening sufficient to weld the tube to the tip, the biasing force presses the parts together to make a secure joint. The mandrel is sufficiently tight fitting that there is substantially no flashing or narrowing of the bore at the joint. Alternately, the bevel may be filled with glue or adhesive, as at 72 in FIG. 12.

Whether collar or bevel type performed tips are used, the assembly time is on the order of 3–5 seconds, as compared to 8–15 seconds for cutting and tip heat-smoothing operations of the prior art. The same principles apply to tips for other types of catheters, such as eyelet type tips for Foley-type catheters.

In addition to the medically smooth insertion tip providing for a transition between the transversely leading edge and the main body portion of the catheter, we may provide the main body portion with an appropriate preformed curve, as seen in FIG. 11. As shown by the dotted curve 39, prior tubes had a set which was a portion of a semicircular arc of radius about 12–18 inches. In contrast, we provide a preformed curve or set to the main body portion which is generally hyperbolic for this type of tube. This more nearly conforms to the general shape of the trachea while the patient is in the supine position in surgery. The hyperbolic curve is preformed in the polyvinylchloride tube by warming the tube, placing it in the appropriate hyperbolic form and letting it cool until the curve is set in the plastic. Because of the circular curve of prior tubes they exhibit drag of the tip along the trachea during insertion, or upon retraction of the insertion obdurator. After obdurator retraction, the tips may rest against the trachea wall causing severe necrosis. See McGinnis et al., An Engineering Analysis of Intratracheal Tube cuffs, Anaesthesia & Analgesia, Current Researches, 50, 557–64 (1971). The hyperbolic curve 40 of our tubes is set into the tube such that the short "radius" portion of the curve 42 is near the proximal end while the relatively straight portion of the curve 41 is at the distal end. With the precision molded tip 19 of this invention, the tube terminates in an axially straight portion which minimizes side wall drag during insertion and tip necrosis.

FIG. 3 also show in more detail one embodiment of the inflation cuff and in accordance with this invention. The cuff assembly 12 basically comprises two elements, a sealing element and an outer cuff member which expands upon inflation to provide the desired seal. As shown in FIGS. 6–9, the inner seal member 43 comprises a cylindrical tube extending axially substantially the length of the outer cuff member 16. However, as shown in FIGS. 1–3, the inner seal member 43 may also be composed of two seal rings 14 and 15 rather than an inner continuous cylindrical tube. In both embodiments, the sealing function is essentially similar. Either rings 14 and 15, or the inner seal 43 grippingly engage the tube body 2 securing the cuff member 12 thereto and preventing leakage of inflation fluid from either the proximal or distal margins of the cuff assembly 12. The seal member has a compression factor of from 5–50 percent, that is, the relaxed I.D. of the seal member is 5–50 percent less than the O.D. of the catheter tube on which it is fit, depending on durometer, such that the harder the durometer of the tube the greater the compression factor. We prefer compression factors in the range of from 10–30 percent for normal durometer range of PVC tubes.

Turning first to the embodiment of the cuff assembly shown in FIGS. 1–3, the inner seal member of this embodiment includes a plurality of rings 14 and 15 one of each being disposed adjacent the proximal and distal ends of the cuff assembly, respectively. In both embodiments, the inner seal members are constructed of a silicone rubber of higher modulus and durometer than the cuff, and which has a compression factor of 5–50 percent in proportion to the tube durometer. The outer, extensible cuff member 16 is bonded to the inner seal member 43 or rings 14, 15 by means of an appropriate adhesive or curable silicone rubber material. Since both members, cuff and seal, are silicone rubber, they can be bonded by conventional techniques. The rings or tubular inner seal member is then expanded mechanically and placed over the tube, or the tube inserted through the expanded seal member. The mechanical expansion is then released and the rings or sleeve firmly grips the outside surface of the body member. In the case of polyvinylchloride, an excellent frictional fit is provided due to its slightly "tacky" surface characteristics. Since these bands do not come into contact with the tissue walls, they may be of properties which lend themselves to gripping the tube and provide for integrity of inflation fluid seal.

As seen in FIG. 3, the rings 14 and 15 may extend beyond the ends of the outer cuff member 16 to provide for a step-wise transition between the outer surface 44 and the outer surface of the cuff 16. In the alternative, the ring 14 may be placed inwardly of the end of the outer cuff member 16 so that a margin 45 of the outer cuff member overlaps to provide for a tapered, smooth transition. As shown in FIG. 3, the margin 45 may be extended axially sufficiently far to abut the proximal edge 22 of the tip assembly 19.

FIGS. 6–9 illustrate another embodiment of the invention in which the inner seal member is tubular in configuration. FIG. 6 shows a retrofit assembly comprising the inner sleeve seal member 43, which is secured to the outer extensible cuff member 16 along margins adjacent the proximal end 46 and the distal end 47 thereof by means of a suitable adhesive 17, 17'. This provides for inflation space 48 which may be inflated by means of the pilot tube 8 and inflation lumen 9 connected to appropriate inflation means such as a syringe (not shown). Like the ring form of sealing member, the inner seal sleeve member 43 has a compression factor of 5–50%, with the inner diameter 49 of the seal being smaller than that of the tube. The sealing sleeve member 43 securely grips the outer surface of the tube 2 providing for a full seal. This is more particularly illustrated in the lower portion of FIG. 7 which shows the cuff in its freely inflated shape. The arrows also show a hydrostatic assist effect wherein the inflation fluid serves both to expand the outer cuff member 16, while at the same time pressing inwardly on the sealing sleeve member 43, thereby increasing the seal of the cuff to the tube body.

The inner seal sleeve member 43 and rings 14, 15 are typically constructed of a high modulus silicone rubber which may be molded or extruded having a durometer, expressed as a Shore A hardness, in the range of 40–90 typically 60–80. While the seal member material may be molded or extruded, we prefer to extrude the seal members and heat cure them. One manner of placing the sealing member sleeves or rings over the tube is by slipping them over the tapered tip assembly 19 and onto the tube body portion. Since the tip is tapered, it facilitates the insertion of the tube 1 into the reduced diameter sleeve or rings.

The upper portion of FIG. 7 illustrates the high degree of true conformability of the outer cuff member 16 when in contact with tissue, such as trachea wall 50. As the cuff is inflated, the outer cuff member 16 expands outwardly until it touches the trachea wall. of our outer cuff materials is the fact that this first contact occurs at relatively low pressure and low volume. The pressure at first contact may be measured and identified as $P_C$. Since the trachea is not round, but rather is generally triangular with the apices of the triangle having rounded corners of short radius, the initial contact along the walls leaves gaps at these apices. Continued inflation, however, presses our outer cuff member into contact and complete conformity with all the walls of the trachea. The pressure at this initial full seal may also be measured, and it is identified as $P_S$. The longitudinal (axial) shape of the cuff of this invention may be seen in FIG. 7 at both initial contact the $P_C$ shape shown on the right hand side of FIG. 7, and at initial full seal, the $P_S$ shape identified in dotted lines at the left side of FIG. 7.

Our cuff material is constructed of a low modulus silicone rubber material of relatively low durometer, high elongation, low strength, and low stress upon sealing, which values may be selected to provide a cuff which, at initial substantially full seal, provides a transmural pressure $P_T$, defined as the seal pressure minus the contact pressure ($P_S-P_C$), of values below those which tend to induce vascular cutoff pressures which produce medically significant tissue pressure necrosis. Normally, this would be below about 30 mm. Hg. pressure transmitted to capillary beds, or the equivalent value of about 10-15 mm. Hg. transmitted to the efferent venous system adjacent the cuff-tissue contact area. We prefer that this transmitted pressure to below about 20-25 mm. Hg. relative to the capillary bed site or about 10 mm. mercury compressive pressure transmitted at the efferent venous site.

A typical composition suitable for cuffs having below the above critical transmural pressure values is one which is of a low modulus, molded silicone rubber having a Shore A hardness of less than about 30, an elongation of greater than about 1000 percent, a tensile strength of below about 700 psi, and a stress value upon sealing inflation of less than about 30 percent of the breaking stress of the cuff material. Other compositions producing the below critical pressure values may also be employed.

The importance of being below the critical value can also be seen from the left hand side of FIG. 7. Since the anesthetist in actual practice is not able to precisely gauge in each instance the exact moment of initial full seal, he is apt to overinflate the cuff to ensure that a seal is made. This is particularly true of prior art catheters employing oversize, large residual volume, cuffs. Since in order to have visibility upon insertion of oversize-cuff-type tubes, the anesthetist selects undersized catheter tube bodies, i.e., those with a small outer diameter. But with small O.D. tubes, the overinflation reaches or exceeds the elastic limits of the PVC or latex outer cuff prior to full seal, and over-critical pressures are generated. In contrast, our silicone rubber outer cuff member conforms generally to the outer shape of the tube i.e. is not oversized, thus permitting insertion visibility. At the same time our cuffs are low volume, low pressure, and highly conformable due to their low modulus and hardness, and high extensibility. Thus the anesthetist may select one of our catheters having an outer diameter more nearly approximating the size of the trachea. This provides for maximum air inflow through the lumen of the endotracheal tube and full seal at extremely low volumes. Since the transmural pressure generated by the cuffs of our invention at full seal are generally below critical, the anesthetist has ample margin for error to over-inflate the cuff without generating over-critical pressures. For example, actual measurements have shown that the anesthetist may have up to about 55 percent leeway to overshoot initial seal as to pressure and/or volume injected into the cuff. In addition, the high conformability and extremely elastic nature of our silicone rubber causes the cuff to extend laterally, rather than radially outwardly, upon over-inflation. This illustrated by the over-inflated shape in the upper left in FIG. 7. In descriptive parlance, the cuff "hotdogs" laterally (axially), rather the "ballooning", i.e. expanding only radially as in the case of prior art PVC or latex cuffs. The cuff of our invention conforms to the trachea shape, rather than forcing the trachea to its shape.

FIG. 6 shows the inner seal member 43 terminating at either end 46, 47 co-extensively with the proximal and distal ends of the outer cuff member 16. In another embodiment shown in FIG. 7, axial margins of either cuff member 16 or inner seal sleeve member 43 may extend beyond the other to provide for more smooth transition between the outer surface of the tube body 2 and the outer cuff member 16. For example, in the upper half of FIG. 7, the outer cuff member 16 has a proximal margin 51, a distal margin 52 each of which extends beyond the ends 46, 47 respectively, of the seal sleeve member 43. The distal margin 52 is shown as abutting the proximal edge 22 of the precision molded tip 19. This provides for an extremely smooth transition between the tip and the outer cuff member 16.

The lower portion of FIG. 7 shows a step-wise transition with proximal margin 53 and distal margin 54 of the inner seal sleeve member 43 extending beyond the ends of the outer cuff member 16.

FIG. 8 shows still another embodiment of the retrofit assembly shown in FIG. 6. In this embodiment, the pilot tube 8 may be omitted and aperture 55 provided in the seal sleeve member 43 for communication with inflation lumen 9 provided in the wall of a stainless steel tracheotomy tube 56. The upper left portion of FIG. 8 shows a step-wise transition with the proximal margin of the sleeve member 43 extending beyond the outer cuff member 16. In contrast, the upper right hand portion of FIG. 8 shows the reverse overlap with distal margin 52 of the outer cuff member 16 overlapping the seal sleeve member 43. The lower half of FIG. 8 shows the gap 37 between the proximal edge of the tip 19 being filled with a silicone rubber adhesive material 38.

FIG. 9 illustrates still further embodiments of the invention with provisions for providing a smooth transition between the cuff and the tube body. In FIG. 9 various types of grooves and overlaps of the cuff and sleeve members are shown. The upper left hand portion of FIG. 9 shows a generally U-shaped groove 57 molded or incised into the body of the plastic, elastomeric or metal tube 56. In this embodiment, the proximal margin 51 of the outer cuff 26 overlaps slightly the sealing sleeve member 43. A smooth transition is provided as shown. At the upper right of FIG. 9, an oblique V-shaped groove 58 is molded or incised into the tube body wall, and co-extensively terminating outer cuff member and sealing members fit snugly therein to provide a smooth transition. The lower portion of FIG. 9 shows on the left hand end the reverse overlap in a U-shaped groove, and the right hand end shows coincident termination of both the outer cuff member and the sleeve member in a U-shaped groove.

FIG. 10 shows still another embodiment of the cuff of this invention wherein the sealing rings 14, 15 have been molded integrally or cured with the outer cuff member 16, placed medially thereof, and the outer surfaces of which are tapered to provide for smooth transition. The outer cuff member 16 is molded or cured to a proximal thickened margin portion 59 and a distal thickened margin portion 60 which have the properties attributed to the securing rings 14 and 15, respectively. As shown in the upper half of FIG. 10 these thickened portions may be inset into one or more grooves 61, 62 and 63 incised or molded into the body of the tube. At the upper left hand portion of FIG. 10, there can be seen a plurality of inwardly projecting feet 64 and 65 which mate with the grooves 63 and 62 respectively. A larger, single foot 66 is shown in groove 61 in the upper right hand portion of FIG. 10. The outer edges of the thickened margin portions 67 and 68 are chamfered to provide for smooth transition between the outer surface of the tube body and the outer cuff member 16. The lower half of FIG. 10 shows this type of cuff placed on a standard tube, the outer surface of which has no special grooves.

Several other advantages to the precision molded tip of this invention are important. First, it is possible to provide the tip with radio-opaque properties such that it may be seen by a x-ray of fluoroscope. For example, the PVC composition may be compounded with a barium sulfate filler material. This permits the very tip of the catheter to be located when the tube is in place in the body. In addition, the thermoplastic polyvinylchloride material, after injection into the precision mold, may be cooled rapidly by running cooling water through the walls of the steel mold. The rapid cooling promotes a very fine surface crystallization which gives the tip a frosted appearance. This frosted appearance is actually a microscopic surface texturing or slight "deformation". This surface texturing is extremely helpful in the insertion of the tube into the body since it promotes ease of sliding due to a mechanical wettability effect. Normally, a polyvinylchloride of moderate durometer is relatively tacky to the touch, and it is difficult to insert a suction or other type of tube of similar material through the center lumen of the trachea tube. In order to permit the tubes to slide one against the other, the surface of one or both should be microscopically roughened. Similarly, the outer surface of the tube is advantageously roughened. This is particularly critical of the tube tip since it meets initial resistance upon insertion. By the frosting effect achieved by mold temperature control, we are able to promote ease of insertion. Likewise, this frosted effect can be produced by slight chemical etching or mechanical abrading of the mold surface. The tips may also be color coded for size or type by use of conventional dyes for ease of selection and prevention of error in use. For example, a different color may be used to identify each of the 12 sizes of tracheal tubes ranging from 5 mm. to 12 mm. I.D.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. An improved catheter comprising:
   a. a tubular, non silicone body portion having an outer surface and a central passage therein extending axially therein from a proximal to a distal end,
   b. said distal end being shaped to provide a smooth gently pointed tip for ease of insertion into contact with tissues,
   c. said central passage of the tubular body portion communicating with an opening in the distal end,
   d. an inflation lumen disposed in association with said tube body portion,
   e. a cuff assembly mounted on said tube body portion comprising:
      i. a seal member to provide for sealingly engaging the cuff assembly with the outer surface of said body portion,
      ii. an expansible silicone tissue-engaging cuff member defining an intracuff inflation space between said cuff and said tube outer surface,
      iii. said expansible cuff portion being substantially cylindrical in its initial deflated condition and secured to said body portion by said seal member, and conforming generally to the outer surface shape of said non silicone tubular body portion in its initial deflated condition,
      iv. said expansible cuff portion being composed of a low modulus silicone rubber having properties of a Shore A hardness of less than about 30, a tensile strength of below about 700 psi, an elongation of above about 1,000 percent, and a stress value upon sealing inflation of less than about 30 percent of the breaking stress of said cuff material, said properties of the silicone rubber cuff thereby resulting in pressures, at substantially complete seal, of less than vascular compressive pressures inducive of significant tissue pressure necrosis,
      v. whereby said cuff upon expansion conforms to irregularities in contacted tissue surfaces and provides lateral sealing while reducing lesions.

2. A catheter assembly as in claim 1 wherein said tube body portion has at least one circumferential groove formed therein to receive a marginal edge of at least one of said cuff assembly members.

3. A catheter assembly as in claim 2 wherein said tube body portion has a plurality of said marginal edge grooves disposed therein.

4. A catheter assembly as in claim 1 wherein said seal member is integral with said cuff member and includes distal and proximal marginal enlargements of said cuff assembly.

5. A catheter assembly as in claim 4 wherein said enlargements are received into grooves formed in the said tubular body portion.

6. A catheter assembly as in claim 1 wherein said cuff member is secured at distal and proximal margins to said seal member.

7. A catheter assembly as in claim 1 wherein said seal member is disposed concentrically interiorly of said cuff member and comprises a axially extending silicone rubber sleeve forming an inner wall of said intracuff inflation space.

8. A catheter assembly as in claim 7 wherein said inflation lumen is disposed in a wall of said tube body portion, said tube body portion has an aperture communicating from said inflation lumen to said outer surface, and said seal member has an aperture therein for communication with said inflation lumen via said body wall aperture.

9. A catheter assembly as in claim 1 wherein said seal member is disposed concentrically interiorly of said cuff member and comprises a plurality of axially extending generally cylindrical rings secured to said cuff member adjacent to the distal and proximal margins thereof.

10. A catheter assembly as in claim 1 wherein said seal member has a compression factor in the range of 5–50 percent.

11. A catheter assembly as in claim 10 wherein the compression factor is selected in relation to the durometer of the tube body portion such that the higher the body portion durometer the higher may be the compression factor.

12. A catheter assembly as in claim 1 wherein a margin of said cuff member extends axially beyond an edge of said seal member.

13. A catheter assembly as in claim 1 wherein a margin of said seal member extends axially beyond an edge of said cuff member.

14. A catheter assembly as in claim 9 wherein a margin of said cuff member extends axially beyond an angle of said seal member.

15. A catheter assembly as in claim 9 wherein a margin of said seal member extends axially beyond an edge of said cuff member.

* * * * *